United States Patent [19]

Martin

[11] Patent Number: 5,796,182
[45] Date of Patent: Aug. 18, 1998

[54] CAPACATOR STORAGE CIRCUIT FOR SUSTAINING A DC CONVERTER

[76] Inventor: Richard A. Martin, 14981 E. Elk Pl. 98-8, Denver, Colo. 80239

[21] Appl. No.: 671,141

[22] Filed: Jun. 27, 1996

[51] Int. Cl.$^6$ .................................................. H02J 7/00
[52] U.S. Cl. ........................................ 307/66; 307/46
[58] Field of Search ............................. 307/64, 65, 66, 307/43, 44, 45, 46, 48, 49; 320/5, 8

[56] References Cited

U.S. PATENT DOCUMENTS

| | | | |
|---|---|---|---|
| 4,672,293 | 6/1987 | Crampton | 320/14 |
| 4,795,914 | 1/1989 | Higa et al. | 307/64 |
| 4,810,936 | 3/1989 | Nuckolls et al. | 315/119 |
| 4,948,987 | 8/1990 | Weber | 307/36 |
| 4,956,584 | 9/1990 | Sikora | 315/241 R |
| 4,962,354 | 10/1990 | Visser et al. | 323/360 |
| 5,012,121 | 4/1991 | Hammond et al. | 307/64 |
| 5,111,058 | 5/1992 | Martin | 307/66 |
| 5,258,901 | 11/1993 | Fraidlin | 363/15 |
| 5,612,581 | 3/1997 | Kageyama | 307/64 |

OTHER PUBLICATIONS

Silicon Zener diode and Rectifier Handbook, Motorola Inc., pp. 96–1106, Dec. 61.

*Primary Examiner*—Jeffrey A. Gaffin
*Assistant Examiner*—Jonathan S. Kaplan

[57] ABSTRACT

Circuitry for extending the sustain time of a DC converter power supply in the event of interruption of AC power. Where in the circuit includes a capacitor storage element, an associated charge path for controllably charging the capacitor bank and discharge and disconnect paths for discharging the energy stored in the capacitor to sustain operation of the DC power converter and for disconnecting the capacitor from the DC converter when the voltage across the capacitor has discharged below a threshold level and prevents the capacitor from creating and introducing periodic ringing transient oscillations into the same charging means, with the charging means and discharging means therefore being connected to said DC voltage source to provide a charging path to said raw DC voltage source during normal operation of the AC power source, and a discharging means to provide a discharging path for said capacitor means to sustain operation of a power converter means during momentary interruption of the AC power source and to disconnect said capacitor means from the DC source means and dc converter means wherein said capacitor means has been discharged to a minimum level required to insure proper operation of said power converter means.

4 Claims, 4 Drawing Sheets

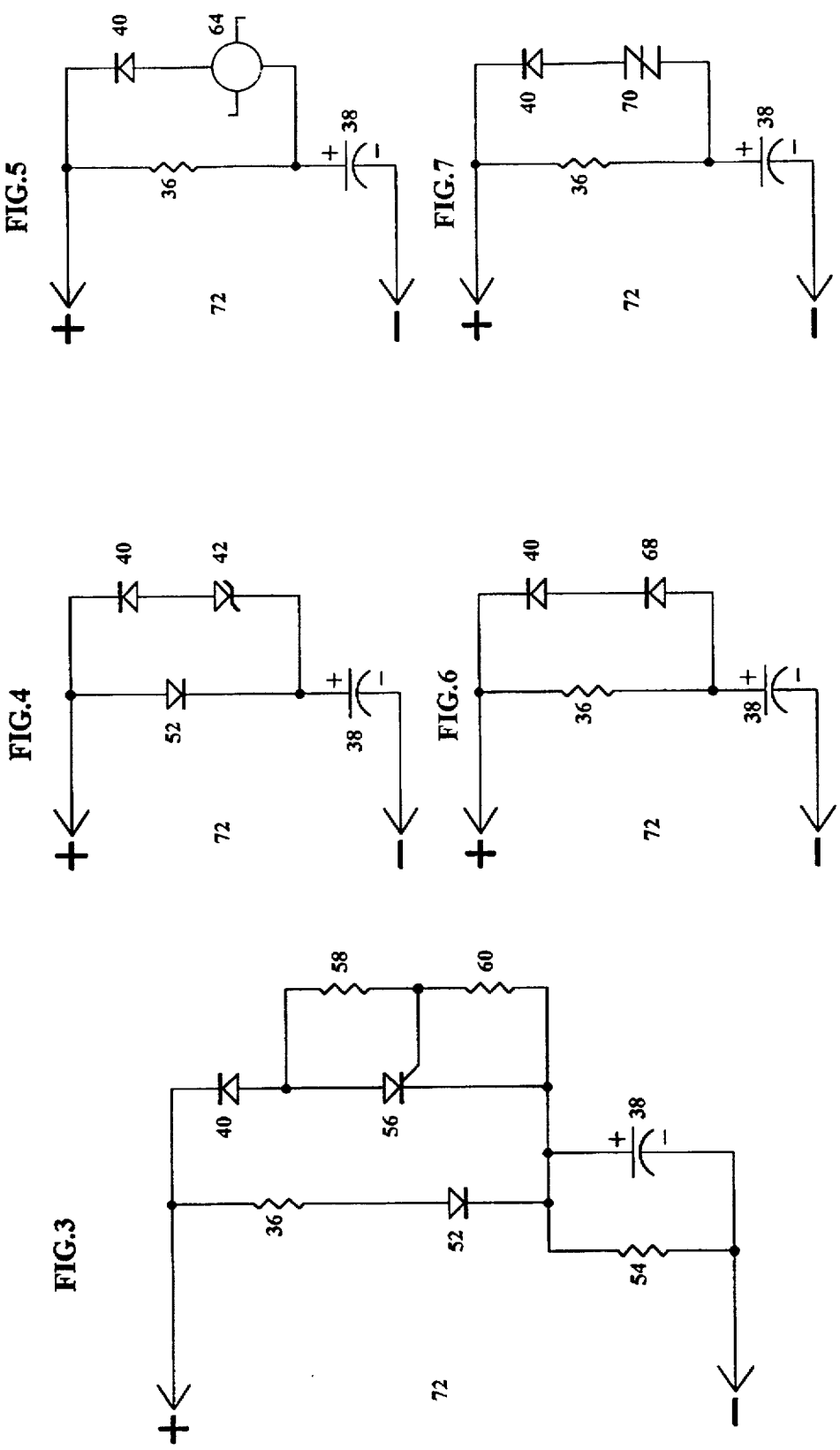

CAPACATOR STORAGE CIRCUIT FOR SUSTAINING A DC CONVERTER

REFERENCE TO RELATED APPLICATION PATENTS

This application is related to U.S. Pat. No. 5,111,058 (May 5, 1992) to R. Martin.

Page three and the diagrams on page six of Disclosure Document No. 381348 (Nov. 11, 1995) contains information and drawings that are prevelent to the present invention. It is requested that the aforementioned disclosure document be made a parmenant part of this application.

FIELD OF THE INVENTION

The present invention relate to DC converter power supplies. In particular the present invention discloses circuitry for sustaining and stabilizing a DC power converter over short duration power outages, sags and other power line disturbances.

BACKGROUND OF THE INVENTION

This invention relates to switch mode DC power supplies as commonly used by but not limited to computers and communication systems, for example to convert AC line power to one or more regulated DC voltage for powering electronic circuitry or other electrical loads. More particularly the present invention is directed to a circuit for sustaining the operation of such power supplies in the event of a momentary interruption of the commercial AC line to which the computer or other electronic apparatus or loads are connected. Additionally the invention improves performance and reduces the element count of my personnel prior art invention, U.S. Pat. No. 5,111,058. It is therefore a principle object of the present invention to produce a circuit that incorporates all the performance improvements mentioned here-in and to produce the present invention more economically and efficiently. Further objects and advantages of the invention will become apparent from a consideration of the drawings and ensuring descriptions.

A seemingly obvious solution to creating switch mode power supplies with extended "hold-up time" is to utilize extremely large value filter capacitors in the AC power supply rectifier filter or AC to DC converter filter section that provides power to the DC converter. The same reasoning could be applied to the filter section of power factor corrected AC to DC sources preceding the DC converter or other AC to DC conversion means.

One reason not to utilize excessively large value filter capacitors in the DC filter section is the peculiar habit of the DC converter tending to operate sporadically and intermittently as the filter section capacitor voltage is reduced to the point of not being able to sustain the DC converter when AC power is removed from the supply. The sporadic operation creates damaging voltage spikes on the output of the DC converter. Another reason as to why not use excessively large filter capacitors is that the inrush current demands require that heavy duty rectifier and line filter components be utilized that can withstand the peak and recurrent current demands during the charging cycle of the filter capacitors and that additional inrush current limiting circuitry be designed into the power supply. This significantly increases design and manufacturing cost.

A simple prior art solution as shown in FIG. 2 that is utilized to increase the hold-up time of linear power supplies does not work with converter systems. The circuit shown introduces periodic ringing oscillations across the primary side of the DC converter if the output of the DC power source contains any ripple component and the voltage of that ripple component is greater than the forward conducting voltage of the diode utilized to create the discharge path. The oscillations are directly determined by the RC time constant of the series charging resistor and the capacitor. It is highly undesirable to add any instabilities to the DC power converter. Adding instability to the DC converter directly defeats the purpose and benefits of directly stabilizing the converter through the use of the invention.

The following is a detailed explanation of the behavior of the DC converter and storage capacitor interaction. Capacitors behave like small storage batteries. Batteries will exhibit an open terminal voltage under a no load condition or lightly loaded condition and a closed terminal voltage under a load. The open terminal voltage is always greater than the loaded or closed terminal condition. This operating condition is imposed by the characteristic source impedance of the batteries. Charged capacitors behaves very similarly. DC converters when operating exhibit low impedance across the capacitors and exhibits an extremely high impedance when the DC converter is turned off. A DC converter does have a specific minimum cutoff operating voltage level. The minimum operating voltage level is dependent upon several factors and it is beyond the scope of this document to explain all the design parameters involved but the usual range of minimum operating voltage is typically between 50 and one hundred and 130 volts DC.

During a power interruption or after line power has been turned off, the filter section capacitor (or capacitors) discharges and the voltage available to the DC converter rapidly decreases. If the load presented to the DC converter( and subsequently the storage capacitor) has not been sufficient to drain the capacitor charge below the minimum threshold operating voltage level of the DC converter, the following actions occur;

The DC converter will operate until the minimum operating voltage level is reached. The DC converter switching circuitry stops oscillating and the load impedance across the storage capacitor becomes extremely high. The open terminal voltage of the capacitors now increases to a level sufficient to once again turn on the DC converter and the voltage of the capacators again rapidly decreases until the capacitor voltage falls below the necessary level to operate the switching transistors and the process keeps repeating itself until the capacitor finally does not have enough charge remaining to allow the open terminal voltage to once again turn on the DC power converter. One problem often encountered is that every time the DC converter turns on and off in this uncontrolled manner the output section of the converter is induced with spikes and these spikes have proven to damage electronic components and in the application of computers have literally been known to corrupt data that is stored on hard drives.

In my previous invention, U.S. Pat. No. 5,111,058, the circuit relied upon a commercially available SIDAC to resolve the turn-off oscillation problem and three additional characteristics were observed. The power supply would not sustain two consecutive 100 millisecond interruptions of the commercial AC power that were separated by as little as a 75 millisecond interval even though the energy level in the capacitor was sufficient to sustain the DC converter and load for 1.5 seconds.

The second characteristic observed was that the invention would not function at all if the power supply was connected to fifty Hz 220 volts AC power. The source of both these characteristics is that the lowest value SIDAC that could be commercially purchased was one that would trigger with a minimum voltage differential of 120 volts. The voltage differential required between the storage capacitor and the nominal filter section for the SIDAC to fire created too large a window and the storage capacitor would not recharge fast enough due to the RC time constant of the charging resistor and the storage capacitor to allow the voltage of the storage capacitor to rise sufficiently to fire the SIDAC when the next 100 millisecond power interruption occurred. The second characteristic of the invention not operating when connected to 50 Hz 220 volt AC power sources, that when the power was interrupted, the 120 volt differential required to force the SIDAC into conduction and the lower operating voltage of the rectifier output and DC converter along with the 50 Hz recharging rate of the filter capacitors simply allowed the Dc converter to stop oscillating before the reserve capacitor could connect in and continue to power the DC converter.

The third characteristic discovered was that when the storage capacitor would connect to the DC converter and the filter ection capacitors that either the SIDAC would short out due to the excessive current flow caused by the large voltage differential required to fire the device requiring that an additional current limiting resistor be added in series with the SIDAC and that even when the SIDAC did not self destruct due to the excessive current, the sudden increasing operating voltage caused by the capacitor connecting into the circuit created a voltage spike across the primary side of the DC converter and of this course was reflected to the secondary side of the DC converter. A typical 5 or 12 volt power buss would receive spikes that were between five and seven times the output voltage and this is not acceptable.

A substitution of the SIDAC was made with a sensitive gate SCR This substitution does allow the voltage differential level required to bring the SCR into conduction to be reduced sufficiently to allow the invention to operate through the previously mentioned and defined repeated short duration power breaks and the invention would now function and operate when connected to 220 v AC 50 Hz sources but the for-mentioned spiking across the primary side of the DC converter and reflected spikes across the secondary still manifested. Additional short comings of the substitution of the SIDAC with the SCR is that the SCR requires two additional resistors to allow the SCR to function as a break-over device and the SCR firing threshold was not always predictable for any given batch of SCRs' and or resistor programming values. The SCR is more difficult to utilize in manufacturing when compared to the SIDAC because the SCR is a three lead device and the SIDAC is a two lead device. It is advantageous to replace the SCR with a series zener and power diode and eliminate the series charging diode that was in series with the charging resistor and eliminate the two biasing resistors required to allow the SCR to trigger.

The preferred embodiment of the invention solvers the above mentioned problems and reduces the actual parts count for production units from 8 ea for the SCR version to 4 ea for the new invention and still performs all the necessary functions and grants the performance improvements over U.S. Pat. No. 5,111,058.

The invention utilizes a zener diode in series with a low cost rectifier diode to perform the necessary differential voltage offset function for disconnecting the capacitor upon discharge to prevent oscillation and to prevent the aforementioned periodic oscillation across the primary side of the DC converter during continual operation of the converter.

The Zenior diode/rectifier switch is in parallel with the capacitor charging resistor. In power supply designs that provide sufficient in-rush current limiting means the charging resistor may be replaced with a diode to isolate the charge and discharge functions. The differential voltage of the discharge circuit can now be set to the minimum voltage differential required to prevent the converter from oscillating with five or six volts being the preferred voltage offset. The series charging diode that was utilized in the previous embodiment can now be eliminated from the invention. The embodiment of the invention utilizing the SIDAC or SCR required the series charging diode because if the charging resistor was not isolated from the discharge path the SIDAC or SCR would not go into conduction because a sufficient quantify of the stored energy in the capacitor would dissipate through the charging resistor while attempting to recharge the filter capacitors and power the DC converter and yet not develop enough voltage differential across the charging resistor because the differential voltage required to bring the SIDAC or SCR into conduction was extreme. The new embodiment of the invention eliminates the requirement for a bleeder resistor to be installed across the storage capacitor because the storage capacitor can now be discharged through the series charging resistor and the typical bleeder resistor or resistors that are installed across the filter capacitor or capacitors in the power supply source.

In the embodiment of the invention that uses a charging diode rather than the charging resistor the storage capacitor will always discharge to the voltage level remaining in the filter capacitor or capacitors plus the off-set level that is determined by the value of the zener diode and the forward voltage drop of reverse blocking diode. This level will usually be sufficient to satisfy any safety considerations.

The invention out performs the previous embodiment considerably. By changing the SIDAC or SCR to a low voltage zener diode the voltage differential required between the filter capacitor and the storage capacitor can be significantly reduced. The output spiking as previously mentioned is virtually eliminated. The 5 to 10 volt spikes that were observed on a typical 5 volt buss even when the substitute SCR was utilized are now reduced to a 50 millivolt or less. This represents at least a 99.5 percent reduction in output power spikes as caused by surge currents when the storage capacitor is connected to the DC converter and filter capacitors.

Another area of improvement that is directly related to the reduction of the required differential voltage to connect the storage capacitor to the converter and DC filter section is the line sensing ability of the invention. The previous design would not connect the capacitor into the circuit until the AC source line voltage drooped about 40 percent. The new invention will now responds to line sags typically as small as 2 percent.

BRIEF DESCRIPTION OF THE DRAWINGS

FIG. 3 is a detailed schemitic of how invention U.S. Pat. No. 5,111,058 is built in actual production.

FIG. 4 is a detailed schemitic of an alternative embodiment of the charging circuit.

FIGS. 5,6 and 7 seven are schemitics of possible substutions of the zener diode with a MOV, a series string of two or more diodes and or other possible break over devices in the discharge path.

DETAILED DESCRIPTION OF THE INVENTION

Figure 1:
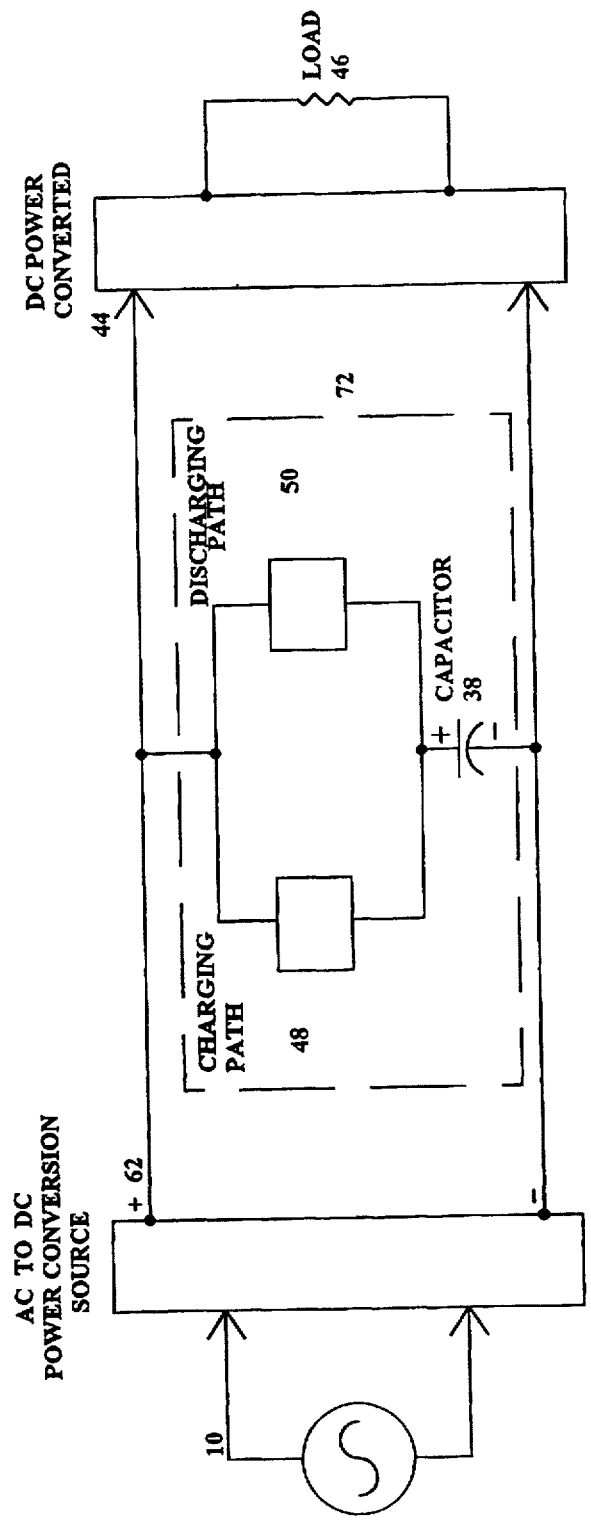
FIG. 1 is a block diagram of the functional invention showing an AC to DC power conversion source, a path to charge and discharge the storage capacator and a DC converter for powering a load.

Referring to FIG. 1; the invention is coupled to the output of the DC source of the power supply 62 that powers the DC converter 44. Ref. 2, 10 through 34 show a 115/220 volt full wave rectifier source as typically implemented in personnel computer power supplies and is not intended in any manor to limit the scope or application of the invention.

FIG. 1 shows that the invention 72 utilizes a charge path, a discharge path and a capacitor energy storage section. The invention is connected in parallel with the DC source and the DC converter.

Figure 2:
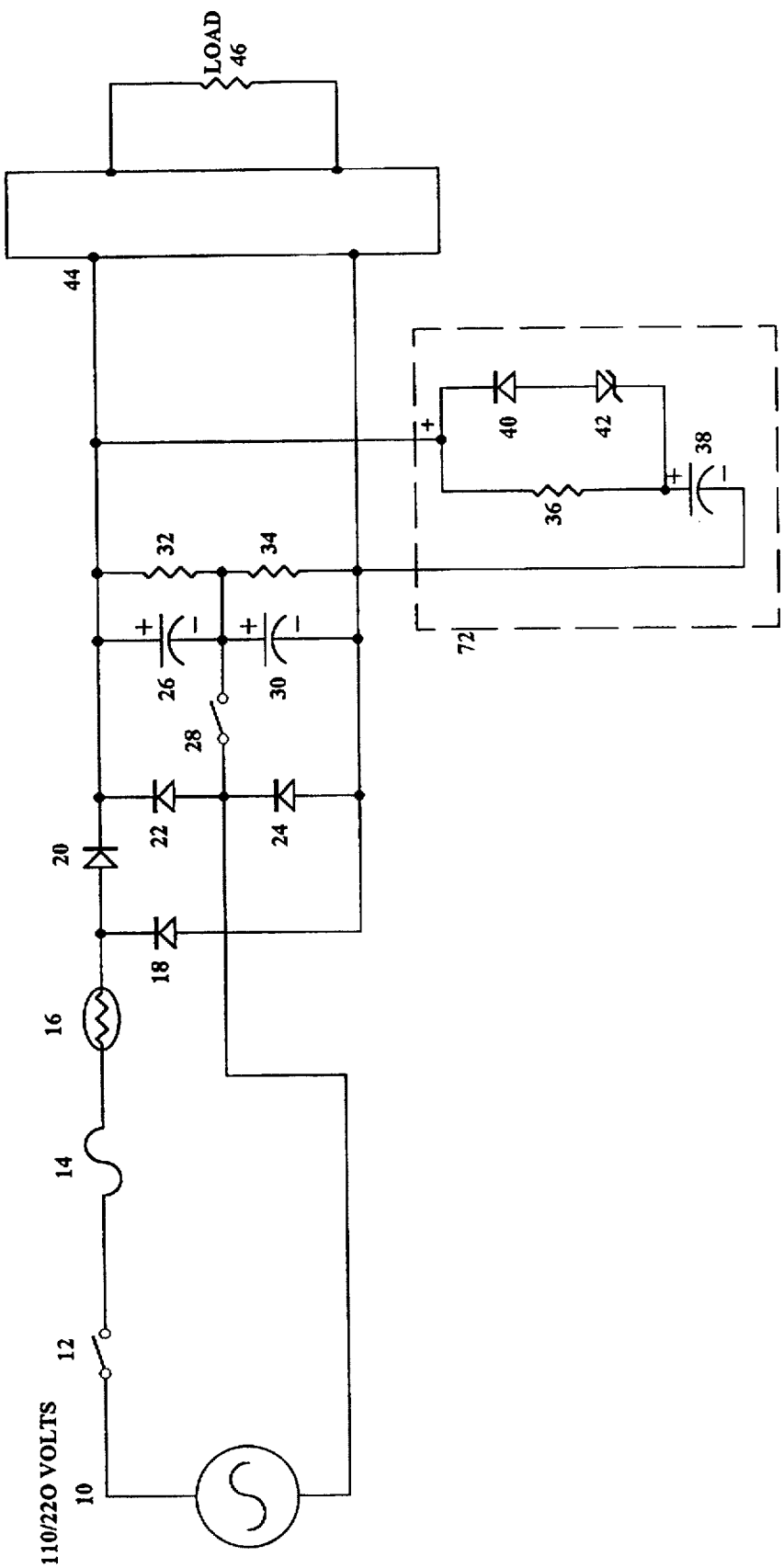
FIG. 2 is a detailed schemitic of a 110/220 v AC source, a voltave doubbling or fullwave bridge power supply, the preferred embodiment of the invention and a block diagram of the DC power converter and a load.
Figure 10:
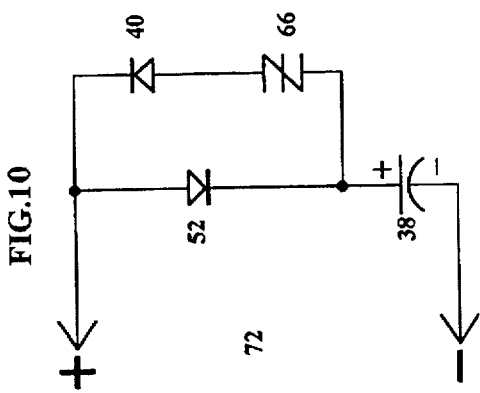
FIGS. 8,9 and 10 are schemitics of the alternative charging path that utilizes the charging diode and replaces the zener diode with a MOV or the series string of diodes and or other possible break over devices in the discharge path.
Figure 9:
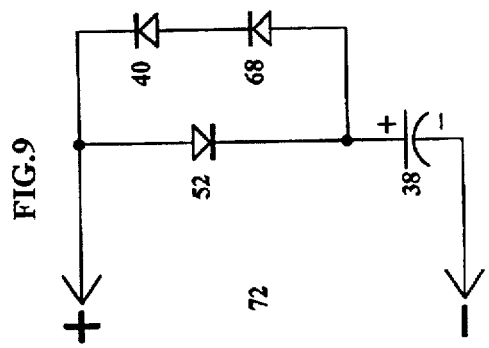

Referring to FIG. 2, Resistor 36 is connected in series to capacitor 38. Current production utilize a storage capacitor 38 in the range of between 470 and 1500 uf. The purpose of the resistor is to limit the charging current that is applied to the capacitor. The resistor can range in values from less than one ohm to several thousand ohms. Typically the value of the resistor is chosen to limit the additional inrush current placed upon the power supply to about a tenth of an ampere. This is a small current increase when compared to the typical 20 or 30 ampere or even greater levels of peak inrush current imposed by typical capacitor input power supplies. The current production value is 1500 ohms. For power supplies that can tolerate the increased inrush current demands resistor 36 may be substituted with a rectifier diode 52 of FIG. 4.

Figure 8:
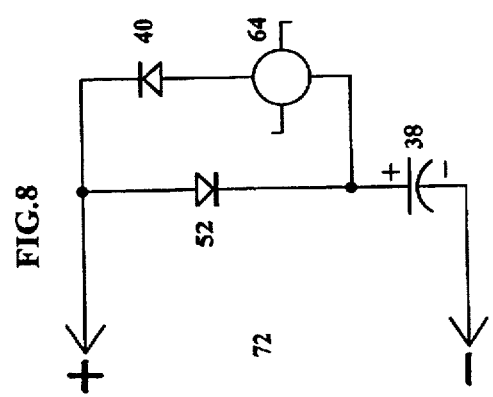
Figure 11:
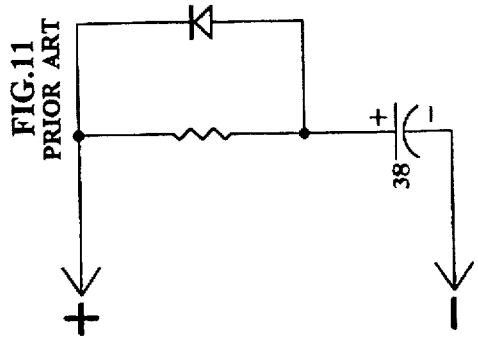
FIG. 11 is a schemitic of a prior art capacator storage circuit as used in conjunction with linear power supplies.

One purpose of rectifier diode 52 is to isolate the charge and discharge paths. Referring to FIG. 2, the purpose of capacitor 38 is to store energy. The series combination of the diode 40 and the zener diode 42 form a unidirectional voltage sensitive switch. The diode prevents the zener 42 from acting as a conducting path that would directly charge the capacitor 38 from the DC source and destroy the zener. The isolation diode 40 installed in the discharge path ensures that the capacitor 38 will charge only through the series charging resistor 36 or charging diode 40. The reduced zener 42 and isolation diode 40 voltage conducting level eliminate the need to utilize the isolation diode 52 in the charging path of FIG. 3. In actual practice the zener diode 42 could be replaced with a string of 2 or more diodes 40, 68 as shown in FIG. 6 or even a MOV 64 as shown in FIG. 5 and FIG. 8. A 1 watt zener is very low in cost when compared to the cost of a 10 ampere sensitive gate SCR 56 FIG. 3 and support components and manufacturing required to provide the same voltage switching and necessary threshold to prevent the formentioned problems of spiking and oscillation. The current production value of the zener diode is 4.7 volts. Bleeder resistor 54 of FIG. 3 has been eliminated from the production circuit because with the removal of diode 52 a direct discharge path exist through charging resistor 36 and the balancing/bleeder resistors 32, 34 of diagram 2. FIG. 3 does show a possible series bleed down path through resistors 58 and 60 but the actual manufacturing value of these resistors combined is well over 800 Kilo ohms and the time required for bleed down of the storage capacator by this path is not considered effective for saftey reasons.

An adequate bleed down path is provided for the circuits of diagram 8,9 and 10 by the direct conducting path of diode 40, and either the MOV 64, the additional diode 68, the transient voltage protector 66 and the bleeder/balancing resistors 32 and 34 of diagram 2. The capacitor discharge paths will work with other filter capacitor bleeder means.

I claim:

1. An anti-oscillation circuit to provide DC electrical energy from a DC storage means to a load comprising: a main power source means providing power to a DC converter means, a charging means for charging said DC storage means connected to a node disposed between said main power source means and said DC converter means, and a discharge means for discharging said DC storage means and connected in parallel with said charging means;

said DC storage means providing stored DC electrical energy to said DC converter means through said discharge means during momentary interruption of said main power source means, said DC charging means also providing a discharging path to allow residual energy of said DC storage means to dissipate through said DC charging means, after said power source means has been interrupted and said discharge means has disconnected said storage means from said DC converter means due to the depletion of electrical energy of the storage means, said residual energy of the DC storage means being dissipated through the charging means prevents the DC power converter means from producing intermittent output power pulses and spikes.

2. The anti-oscillation circuit of claim 1, wherein said charging means comprises only a resistor wherein a first end of said resistor is directly connected to said node and a second end of said resistor is directly connected to said DC storage means, said discharging means comprising a diode and a zener diode connected together in series wherein the cathode of said diode is directly connected to said first end of said resistor and the anode of said diode is directly connected to the anode of said zener diode and the cathode of said zener diode is connected to said second end of said resistor.

3. An anti-oscillation circuit of claim 1, wherein said main power supply comprises a fullwave voltage doubler; and wherein said DC converter means supplies power to said loads.

4. An anti-oscillation circuit of claim 1, wherein said electrical storage means comprises a capacitor.

* * * * *